United States Patent
Brown et al.

(10) Patent No.: US 9,896,184 B2
(45) Date of Patent: Feb. 20, 2018

(54) LOCKING APPARATUS AND METHOD (71) Applicant: BAE SYSTEMS PLC, London (GB)

(72) Inventors: Robert Brown, Warton (GB); Philip Orr, Warton (GB)

(73) Assignee: BAE SYSTEMS PLC, London (GB)

( * ) Notice: Subject to any disclaimer, the term of this patent is extended or adjusted under 35 U.S.C. 154(b) by 256 days.

(21) Appl. No.: 14/648,132

(22) PCT Filed: Nov. 27, 2013

(86) PCT No.: PCT/GB2013/053137
§ 371 (c)(1),
(2) Date: May 28, 2015

(87) PCT Pub. No.: WO2014/083334
PCT Pub. Date: Jun. 5, 2014

(65) Prior Publication Data
US 2015/0298789 A1 Oct. 22, 2015

(30) Foreign Application Priority Data

Nov. 29, 2012 (EP) .................................... 12275187
Nov. 29, 2012 (GB) ................................... 1221455.7

(51) Int. Cl.
*E05C 3/02* (2006.01)
*B64C 1/14* (2006.01)
(Continued)

(52) U.S. Cl.
CPC .......... *B64C 1/1407* (2013.01); *E05B 35/008* (2013.01); *E05C 9/08* (2013.01)

(58) Field of Classification Search
CPC . B64C 1/14; Y10T 292/0807; Y10T 292/081; Y10T 292/0875; E05C 19/12;
(Continued)

(56) References Cited

U.S. PATENT DOCUMENTS 1,551,506 A * 8/1925 Parsons ..................... E05C 9/08
                                                              292/118
2,748,855 A * 6/1956 Siems .................. B64C 1/1407
                                                              160/180
(Continued)

FOREIGN PATENT DOCUMENTS

FR          2184148 A5    12/1973
FR          2380398 A1     9/1978
GB          2188094 A      9/1987

OTHER PUBLICATIONS

EP Search Report dated May 6, 2013 of Patent Application No. EP 12275187.8 filed Nov. 29, 2012.
(Continued)

*Primary Examiner* — Mark Williams
(74) *Attorney, Agent, or Firm* — Maine Cernota & Rardin (57) ABSTRACT

An aircraft fuselage (4) comprising: an aircraft door or access panel (2) comprising a receiving element (14); and locking apparatus for securing the aircraft door/panel (2) in an opening of aircraft fuselage (4), the locking apparatus comprising: a shaft (8); a mounting member (10) for mounting the shaft (8) to the fuselage (4); securing means (12) fixedly mounted to the shaft (8) and arranged such that rotation of the shaft (8) about its longitudinal axis moves the securing means (12) from being not coupled to a receiving element (14) to being coupled to a receiving element (14) or vice versa; a locking member (52) for coupling to the shaft (8) such that rotation of the shaft (8) causes movement of the locking member (52); and fixing means for fixedly attaching the locking member (52) to the aircraft fuselage (4) thereby preventing rotation of the shaft (8).

11 Claims, 8 Drawing Sheets

(51) Int. Cl.
*E05C 9/08* (2006.01)
*E05B 35/00* (2006.01)

(58) Field of Classification Search
CPC ... E05C 9/08; E05C 9/1891; E05Y 2900/502; E05F 15/622
USPC ......................................................... 292/194
See application file for complete search history.

(56) References Cited

U.S. PATENT DOCUMENTS

| | | |
|---|---|---|
| 4,125,235 A | 11/1978 | Fitzgerald |
| 4,470,566 A | 9/1984 | Fitzgerald |
| 4,473,201 A * | 9/1984 | Barnes .................. B64C 1/1415 244/129.5 |
| 6,026,665 A * | 2/2000 | Raybary ............... E05B 37/163 70/214 |

OTHER PUBLICATIONS

EP Search Report dated Jun. 30, 2014 of Patent Application No. EP 12275187.8 filed Nov. 29, 2012.
GB Search Report dated Mar. 26, 2013 of Patent Application No. GB 1221455.7 filed Nov. 29, 2012.

\* cited by examiner

LOCKING APPARATUS AND METHOD

RELATED APPLICATIONS

This application is a national phase application filed under 35 USC §371 of PCT Application No. PCT/GB2013/053137 with an International filing date of 27 Nov. 2013 which claims priority of GB Patent Application 1221455.7 filed 29 Nov. 2012 and EP Patent Application 12275187.8 filed 29 Nov. 2012. Each of these applications is herein incorporated by reference in their entirety for all purposes.

FIELD OF THE INVENTION

The present invention relates to the securing, or locking, of aircraft doors or access panels into openings formed in an aircraft fuselage.

BACKGROUND

Avionics bay doors, or hinged access panels, of aircraft are secured so that they do not open during flight.

Conventionally, the securing of a hinged access panel on an aircraft is performed using a plurality of panel fasteners to attach the panel to the aircraft fuselage such that it does not move relative to the fuselage. Typically, depending on the size of the aircraft door or panel, twenty to thirty such fasteners may be used.

The fastener threads of the panel fasteners may be visible to radar systems. Also, fastener heads tends to have a limited life.

The securing of a hinged access panel on an aircraft using a plurality of panel fasteners tends to be a time consuming and costly process.

SUMMARY OF THE INVENTION

In a first aspect, the present invention provides an aircraft fuselage comprising an aircraft door or panel, and a locking apparatus for securing the aircraft door or panel in an opening formed in an aircraft fuselage. The aircraft door or panel comprises one or more receiving elements for receiving securing means of the locking apparatus. The locking apparatus comprises a shaft having a longitudinal axis, at least one mounting member for mounting the shaft to the aircraft fuselage such that the shaft may be rotated about its longitudinal axis, door/panel securing means fixedly mounted to the shaft and arranged such that: rotation of the shaft about its longitudinal axis moves the securing means from being in a first position to being in a second position (the first position being such that the securing means are not coupled to the receiving element(s) of the aircraft door/panel such that movement of the aircraft door/panel relative to the aircraft fuselage is permitted, and the second position of the securing means being such that the securing means are engaged with the receiving element(s) of the aircraft door/panel such that movement of the aircraft door/panel relative to the aircraft fuselage is opposed or prevented), a locking member for coupling to the shaft such that rotation of the shaft about its longitudinal axis causes movement of the locking member, and fixing means for, when the shaft has been rotated such that the securing means are in the second position, fixedly attaching the locking member to the aircraft fuselage thereby preventing rotation of the shaft.

The present invention provides locking apparatus for an aircraft door or access panel, the locking apparatus being for securing the aircraft door or panel in an opening formed in an aircraft fuselage. The locking apparatus comprises a shaft having a longitudinal axis, at least one mounting member for mounting the shaft to the aircraft fuselage such that the shaft may be rotated about its longitudinal axis, door/panel securing means fixedly mounted to the shaft and arranged such that: rotation of the shaft about its longitudinal axis moves the securing means from being in a first position to being in a second position (the first position being such that the securing means are not coupled to the aircraft door/panel such that movement of the aircraft door/panel relative to the aircraft fuselage is permitted, and the second position of the securing means being such that the securing means are engaged with the aircraft door/panel such that movement of the aircraft door/panel relative to the aircraft fuselage is opposed or prevented), a locking member for coupling to the shaft such that rotation of the shaft about its longitudinal axis causes movement of the locking member, and fixing means for, when the shaft has been rotated such that the securing means are in the second position, fixedly attaching the locking member to the aircraft fuselage thereby preventing rotation of the shaft.

The locking member may be configured to be coupled to the shaft such that the locking member forms a lever that is rotatable about a fulcrum, the fulcrum being the longitudinal axis of the shaft.

The locking member may be configured to be fixedly attached, by the fixing means, to the aircraft fuselage at a point along a length of the locking member that is proximate to a distal end of the locking member (i.e. an end of the locking member that is furthest away from the fulcrum).

The locking member may be configured to be fixedly attached, by the fixing means, to the aircraft fuselage, at a plurality of different points on the locking member.

The shaft may comprise a bolt, a longitudinal axis of the bolt being aligned with the longitudinal axis of the shaft.

The locking member may comprise a hole, the shape of the hole corresponding to the shape of the bolt such that the locking member may be coupled to the shaft by positioning the locking member relative to the shaft such that the bolt is in the hole.

The shaft may comprise a notch, a diameter of the notch being less than a diameter of the hole in the locking member such that, when the locking member is positioned relative to the shaft such that the notch is in the hole, the locking member may be rotated about the longitudinal axis of the shaft without the shaft being rotated, thereby allowing an orientation of the locking member relative to the shaft to the adjusted.

The shaft may comprise an adjustment bolt, a longitudinal axis of the adjustment bolt being aligned with the longitudinal axis of the shaft, the adjustment bolt being positioned at point along the length of the shaft such that, using the adjustment bolt, a human operator may rotate the shaft.

The fixing means may comprise a clamping block that is fixedly attached to the aircraft fuselage and may be configured to provide one or more surfaces that are substantially perpendicular to the longitudinal axis of the shaft.

The locking member may be fixedly attached to the aircraft fuselage by fixedly attaching the locking member to a surface of the clamping block that is substantially perpendicular to the longitudinal axis of the shaft.

The locking member may be configured to be fixedly attached the clamping block by, for one or more bolts, positioning each of those bolts such that that bolt is within a respective hole through the locking member and in a respective hole in the clamping block.

The receiving elements may include one or more clamping brackets (e.g. handle-like brackets) fixedly attached to the aircraft door/panel, wherein the securing means are configured to attach to each of the one or more clamping brackets.

The securing means may include one or more locking brackets (e.g. hook-like, or hook-shaped, brackets), each locking bracket being fixedly attached to the shaft at a position along the length of the shaft, each locking bracket being configured to be hooked onto a respective clamping bracket such that that clamping bracket is securely held by that locking bracket.

The aircraft door or access panel may be a hinged door or access panel.

The shaft, the at least one mounting member, the securing means, the locking member, and/or the fixing means may be made of metal (e.g. steel).

In a further aspect, the present invention provides an aircraft comprising a fuselage according to the first aspect, i.e. an aircraft door or access panel, an aircraft fuselage, and a locking apparatus for securing the aircraft door/panel in an opening formed in the aircraft fuselage, according to the first aspect of the present invention.

The present invention provides a method of securing an aircraft door or access panel in an opening formed in an aircraft fuselage, aircraft door or access panel comprising one or more receiving elements for receiving securing means of a locking apparatus, the method comprising: providing a shaft having a longitudinal axis, the shaft being mounted, by at least one mounting member, to the aircraft fuselage such that the shaft may be rotated about its longitudinal axis; providing door/panel securing means, the securing means being fixedly mounted to the shaft; rotating the shaft, thereby moving the securing means from being in a first position to being in a second position, the first position being such that the securing means are not coupled to the receiving element(s) of the aircraft door/panel such that movement of the aircraft door/panel relative to the aircraft fuselage is permitted, and the second position of the securing means being such that the securing means are engaged with the receiving element(s) of the aircraft door/panel such that movement of the aircraft door/panel relative to the aircraft fuselage is opposed or prevented; coupling a locking member to the shaft such that rotation of the shaft about its longitudinal axis causes movement of the locking member; and, when the shaft has been rotated such that the securing means are in the second position, fixedly attaching, using fixing means, to the aircraft fuselage, the locking member, thereby preventing the shaft from rotating.

The present invention provides a method of securing an aircraft door or access panel in an opening formed in an aircraft fuselage, the method comprising: providing a shaft having a longitudinal axis, the shaft being mounted, by at least one mounting member, to the aircraft fuselage such that the shaft may be rotated about its longitudinal axis; providing door/panel securing means, the securing means being fixedly mounted to the shaft; rotating the shaft, thereby moving the securing means from being in a first position to being in a second position, the first position being such that the securing means are not coupled to the aircraft door/panel such that movement of the aircraft door/panel relative to the aircraft fuselage is permitted, and the second position of the securing means being such that the securing means are engaged with the aircraft door/panel such that movement of the aircraft door/panel relative to the aircraft fuselage is opposed or prevented; coupling a locking member to the shaft such that rotation of the shaft about its longitudinal axis causes movement of the locking member; and, when the shaft has been rotated such that the securing means are in the second position, fixedly attaching, using fixing means, to the aircraft fuselage, the locking member, thereby preventing the shaft from rotating.

The shaft may comprise a bolt, a longitudinal axis of the bolt being aligned with the longitudinal axis of the shaft. The locking member may comprises a hole, the shape of the hole corresponding to the shape of the bolt. The step of coupling a locking member to the shaft may comprise positioning the locking member relative to the shaft such that the bolt is in the hole.

DETAILED DESCRIPTION

Figure 1:
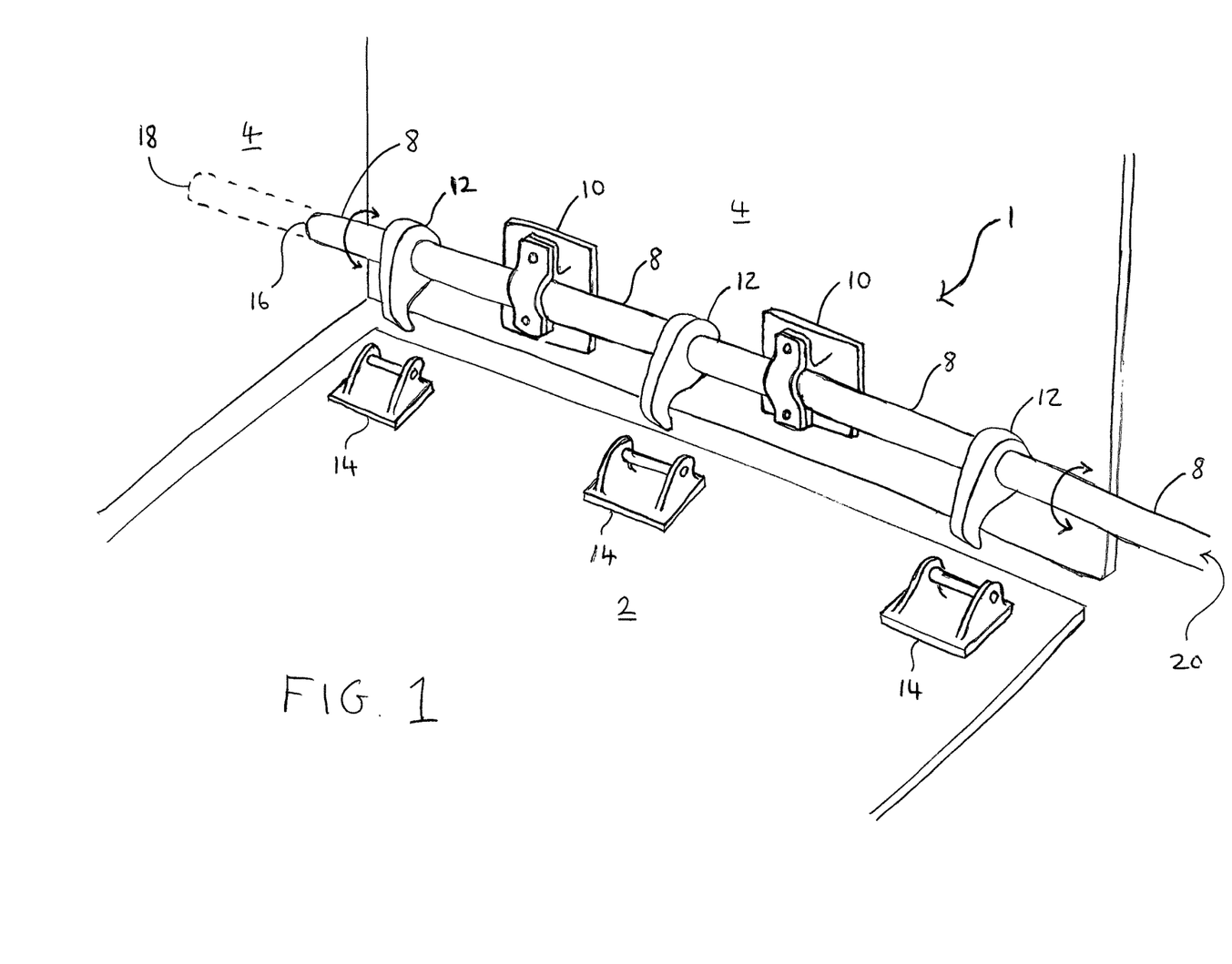
FIG. 1 is a schematic illustration (not to scale) showing a perspective view of components of a fastening system.

FIG. 1 is a schematic illustration (not to scale) showing a perspective view of an embodiment of a fastening system 1 for fastening, or fixing, an aircraft door or hinged access panel of an aircraft (hereinafter referred to as the "aircraft door" and indicated in FIG. 1 by the reference numeral 2) against the aircraft fuselage frame 4.

In this embodiment, when not fixed by the fastening system 1, the aircraft door 2 is movable with respect to aircraft fuselage frame 4. For example, the aircraft door 2 may be mounted to the aircraft fuselage frame 4 via (e.g. two or more) hinges (not shown in the Figures). The aircraft door 2 and the aircraft fuselage frame 4 are parts of an aircraft.

In this embodiment, the fastening system 1 comprises a shaft 8, two shaft mounts 10, three hook-shaped, or hook-like, locking brackets 12, and three receiving elements in the form of clamping brackets 14. Also, the system further comprises a clamping block (not shown in FIG. 1) and a locking plate (not shown in FIG. 1). The clamping block is described in more detail later below with reference to FIG. 4. The locking plate is described in more detail later below with reference to FIG. 5.

The fastening system 1 (including the later described clamping block and locking plate) may be entirely located within the aircraft whose aircraft door 2 is to be fastened by the fastening system 1.

In this embodiment, the shaft 8 is rotatable about its longitudinal axis, as indicated in FIG. 1 by solid arrows. The shaft 8 is a tubular shaft that is made of metal.

In this embodiment, the shaft 8 is securely mounted to the aircraft fuselage frame 4 via the two shaft mounts 10 and end brackets (not shown in Figures for reasons of clarity). In other embodiments, the shaft 8 may be mounted to the aircraft fuselage frame 4 using a different number of shaft mounts 10. The mounting of the shaft 8 to the aircraft fuselage frame 4 is such that the shaft 8 may be rotated about its longitudinal axis, and such that movement of the shaft 8 in a direction that is perpendicular to the longitudinal axis of the shaft is substantially prevented.

In this embodiment, the shaft mounts 10 are made of metal. The shaft mounts 10 are securely mounted to the aircraft fuselage frame 4 such that the positions of the shaft mounts 10 with respect to the aircraft fuselage frame 4 are fixed. The shaft mounts 10 are described in more detail later below with reference to FIG. 2.

In this embodiment, the shaft 8 passes through a hole 16 in the aircraft fuselage frame 4 such that a first end 18 of the shaft 8 (indicated in FIG. 1 by dotted lines) is located at a different side of the aircraft fuselage frame 4 to the side of the aircraft fuselage frame 4 at which a second end 20 of the shaft 8 is located. The first end 18 of the shaft 8 and the second end 20 of the shaft 8 are opposite ends of the shaft 8.

The first end 18 of the shaft 8 is described in more detail later below with reference to FIG. 4.

In this embodiment, the locking brackets 12 are made of metal. The locking brackets 12 are fixed to the shaft 8 (e.g. by welding or by being bolted) such that the position of a locking bracket 12 relative to the shaft 8 is fixed. Each locking bracket 12 is fixed to the shaft 8 at a position along the length of the shaft 8 that is opposite to a respective clamping bracket 14. Also, as described in more detail later below with reference to FIGS. 2 and 3, each locking bracket 12 is configured to be hooked (by rotating the shaft 8 about its longitudinal axis) onto a respective clamping bracket 14 such that that clamping bracket 14 is securely held by that locking bracket 12. In this embodiment, when one of the locking brackets 12 is hooked onto its respective clamping bracket 14, each of the other locking brackets 12 hooks onto their respective clamping brackets 14. Similarly, in this embodiment, when one of the locking brackets 12 is not hooked onto its respective clamping bracket 14, each of the other locking brackets 12 is not hooked onto their respective clamping brackets 14.

In this embodiment, the clamping brackets 14 are made of metal. The clamping brackets 14 are securely mounted to the aircraft door 2 such that the positions of the clamping brackets 14 with respect to the aircraft door 2 are fixed. Each clamping bracket 14 is fixed to the aircraft door 2 such that it is opposite to a locking bracket 12 on the shaft 8. As described in more detail later below with reference to FIGS. 2 and 3, each clamping bracket 14 comprises a crossbar shaft and roller around which a respective locking bracket 12 may be securely hooked. Thus, in effect, each of the clamping brackets 14 is a handle that may be held by, i.e. securely hooked onto by, a respective hook-shaped locking bracket 12.

In this embodiment, there are three locking brackets 12 and three corresponding clamping brackets 14. However, in other embodiments, there may be a different number of locking bracket-clamping bracket pairs.

Figure 2:
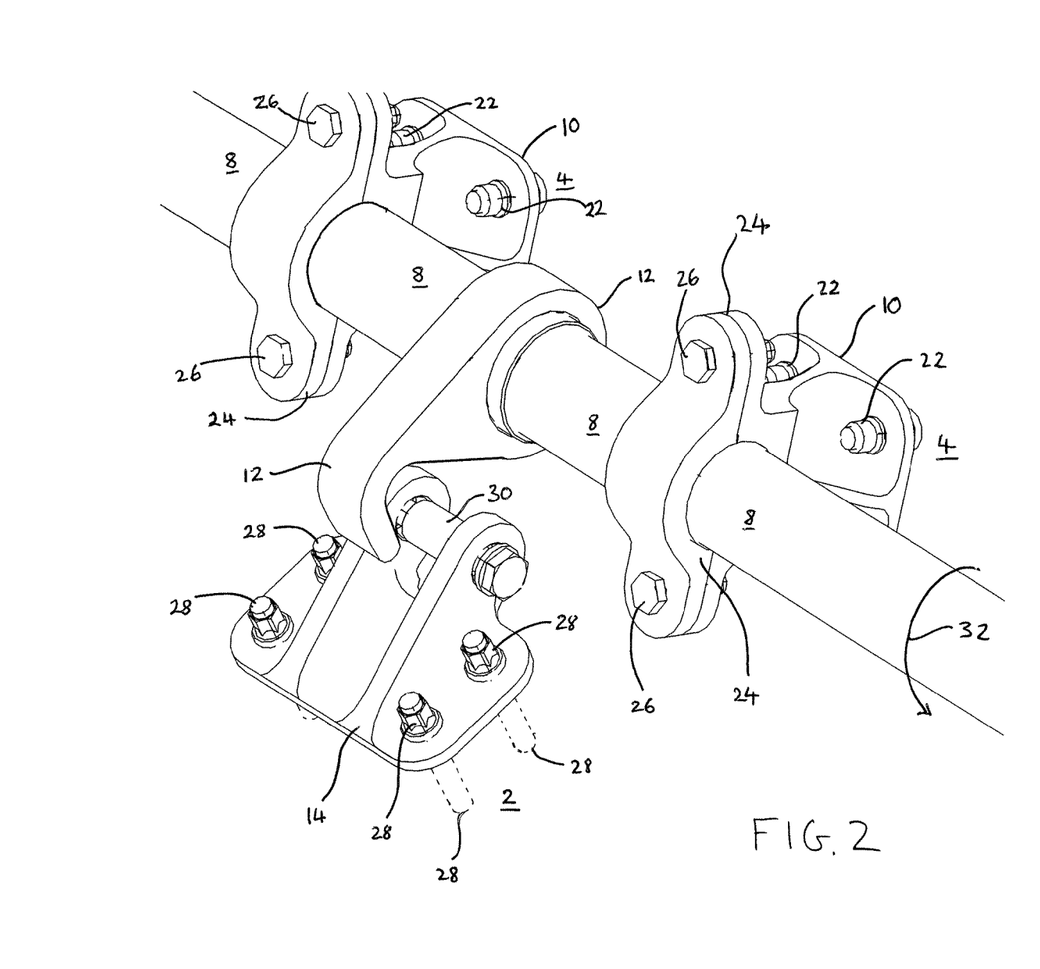
FIG. 2 is a schematic illustration (not to scale) showing certain components of the fastening system in greater detail.

FIG. 2 is a schematic illustration (not to scale) showing further detail of the shaft 8, a shaft mount 10, a locking bracket 12, and clamping brackets 14 corresponding to that locking bracket 12.

In this embodiment, each shaft mount 10 is fixed to the aircraft fuselage frame 4 by a first set of bolts, each of which is hereinafter referred to as a "first bolt" and is indicated in the Figures by the reference numeral 22. Each of the first bolts 22 passes through the body of a shaft mount 10 and into the aircraft fuselage frame 4, thereby securely fixing that shaft mount 10 to the aircraft fuselage frame 4. In this embodiment, each shaft mount 10 is fixed to the aircraft fuselage frame 4 by four first bolts 22. However, in other embodiments, each shaft mount 10 may be fixed to the aircraft fuselage frame 4 by a different number of bolts, or using different fixing means.

In this embodiment, each shaft mount comprises a clamp 24 that clamps around the shaft 8. The clamp 24 of each shaft mount 8 is configured to allow the shaft 8 to be rotated about its longitudinal axis. Also, the clamp 24 of each shaft mount 10 is configured to prevent or oppose movement of the shaft 8 in a direction that is perpendicular to the longitudinal axis of the shaft 8. Each of the clamps 24 is secured around the shaft 8 by a second set of bolts, each of which is hereinafter referred to as a "second bolt" and is indicated in the Figures by the reference numeral 26. Each of the second bolts 26 passes through the two clamping jaws that form each clamp 24, thereby securely fixing that clamp 24 around the shaft 8. In this embodiment, each clamp 24 is fixed around the shaft 8 by two second bolts 26. However, in other embodiments, each clamp 24 may be fixed around the shaft 8 by a different number of bolts, or using different fixing means. Also, in other embodiments, the shaft 8 may be fixed to the aircraft fuselage frame 4 (such that rotation of the shaft about its longitudinal axis is permitted) by a different holding means.

In this embodiment, each clamping bracket 14 is fixed to the aircraft door 2 by a third set of bolts, each of which is hereinafter referred to as a "third bolt" and is indicated in the Figures by the reference numeral 28. Each of the third bolts 28 passes through the body of a clamping bracket 14 and into the aircraft door 2, thereby securely fixing that clamping bracket 14 to the aircraft door 2. In this embodiment, each clamping bracket 14 is fixed to the aircraft door 2 by four third bolts 28. However, in other embodiments, each clamping bracket 14 may be fixed to the aircraft door 2 by a different number of bolts, or using different fixing means.

In this embodiment, each clamping bracket comprises a crossbar shaft and roller (which is hereinafter referred to as the "crossbar" and indicated in the Figures by the reference numeral 30) onto which a respective locking bracket 12 may be securely hooked.

In FIG. 2, the locking bracket 12 is not hooked onto the respective crossbar 30. Thus, in FIG. 2, the clamping bracket 14 is not securely held by the respective locking bracket 12. Thus, in FIG. 2, the aircraft door 2 is able to be moved with respect to the aircraft fuselage frame 4.

The locking bracket 12 shown in FIG. 2 may be hooked onto the crossbar 30 of the clamping bracket 14 shown in FIG. 2, by rotating the shaft 8 about its longitudinal axis in a direction indicated in FIG. 2 by the solid arrow and the reference numeral 32. In other words, the locking bracket 12 shown in FIG. 2 may be hooked onto the crossbar 30 of the clamping bracket shown in FIG. 2, by rotating the shaft 8 about its longitudinal axis in an anti-clockwise direction. Doing so (i.e. rotating the shaft 8 about its longitudinal axis in an anti-clockwise direction) would cause each of the locking brackets 12 along the length of the shaft 8 to hook over a crossbar 30 of a respective clamping bracket 14.

Figure 3:
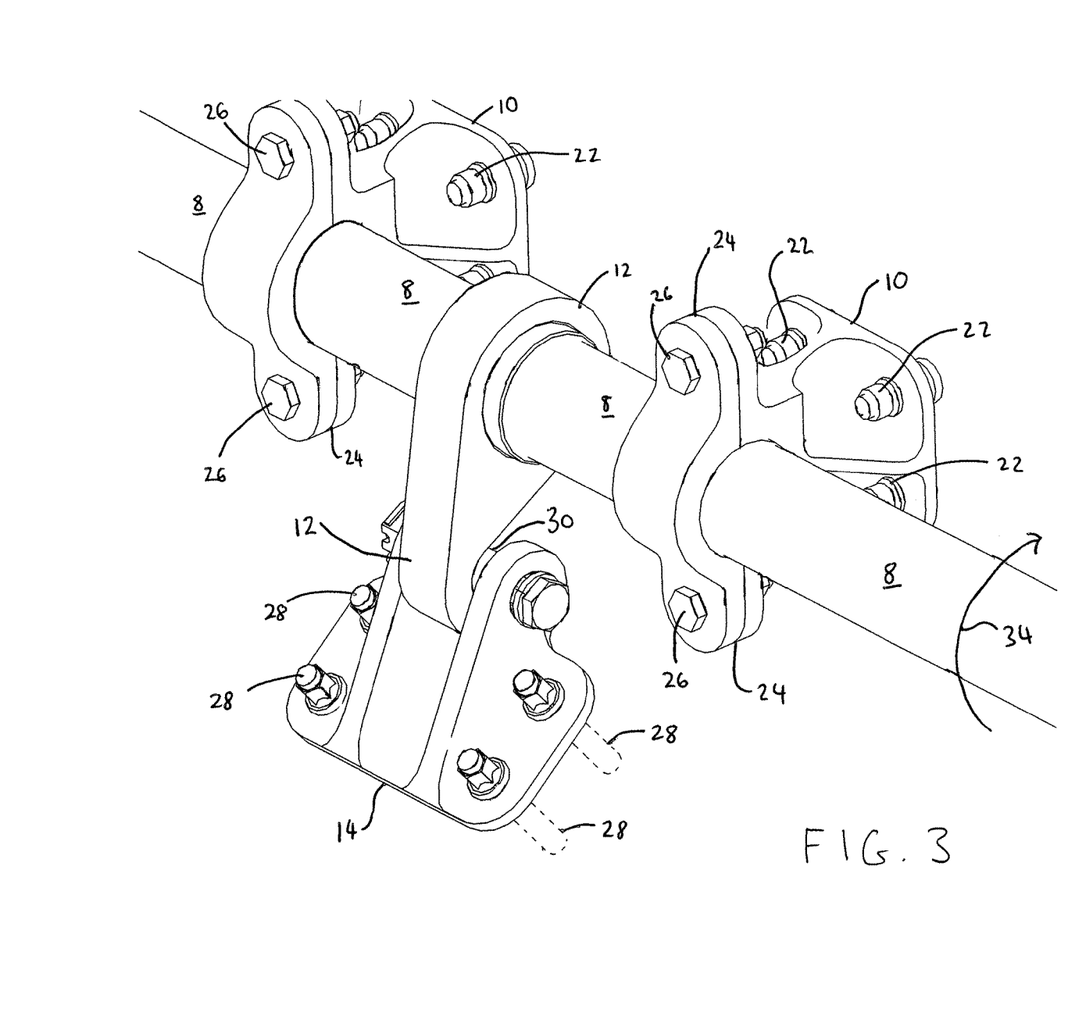
FIG. 3 is a schematic illustration (not to scale) showing certain components of the fastening system in greater detail.

FIG. 3 is a schematic illustration (not to scale) of the components of the system 1 shown in FIG. 2 after the shaft 8 has been rotated about its longitudinal axis, in an anti-clockwise direction, such that the locking bracket 12 hooks onto the crossbar 30 of the respective clamping bracket 14.

The hooking of the locking brackets 12 onto their respective clamping brackets 14 causes the respective clamping bracket 14 to be held in fixed positions relative to the locking brackets 12 (and therefore also the shaft 8 and shaft mounts 10). Thus, by hooking the locking brackets 12 onto their respective clamping brackets 14, the aircraft door 2 is securely held in a fixed position relative to the aircraft fuselage frame 4.

The locking bracket 12 shown in FIG. 3 may be unhooked from the crossbar 30 of the clamping bracket 14 shown in FIG. 3, by rotating the shaft 8 about its longitudinal axis in a direction indicated in FIG. 3 by the solid arrow and the reference numeral 34, i.e. in a clockwise direction. Doing so (i.e. rotating the shaft 8 about its longitudinal axis in a clockwise direction) would cause each of the locking brackets 12 along the length of the shaft 8 to unhook from a crossbar 30 of a respective clamping bracket 14, thereby returning the system 1 to the configuration shown in FIG. 2.

Figure 4:
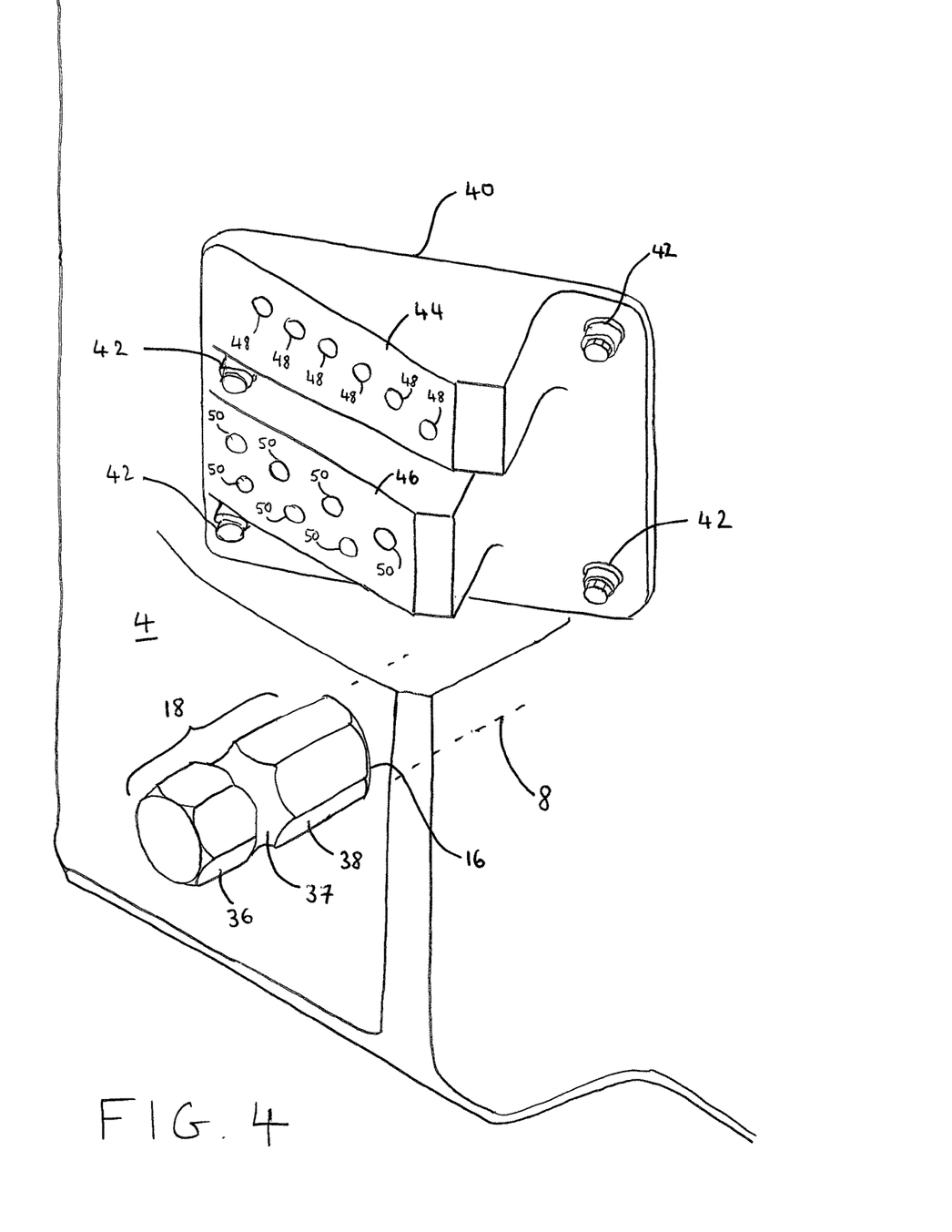
FIG. 4 is a schematic illustration (not to scale) showing a perspective view of components of the fastening system.

FIG. 4 is a schematic illustration (not to scale) showing a perspective view of the opposite side of the aircraft fuselage frame 4 to that which is shown in FIG. 1. In other words, FIG. 4 shows further components of the system 1 (including the clamping block 40) that are located at the side of the aircraft fuselage frame 4 at which the first end 18 of the shaft 8 is located.

In this embodiment, the first end 18 of the shaft 8 comprises an outer bolt 36, a notch 37, and an inner bolt 38. In this embodiment, the outer bolt 36, the notch 37, and the inner bolt 38 are a single complete component that is located at an end of the shaft 8.

The outer bolt 36 is a hexagonal bolt that is located at the free end of the first end 18 of the shaft 8. The outer bolt 36 is located next to the notch 37. In this embodiment, the maximum diameter of the outer bolt 36 is substantially the same as the diameter of the portion of the shaft 8 that is coupled to the locking brackets 12 and shaft mounts 10.

The notch 37 is located at the first end 18 of the shaft 8, between the outer bolt 36 and the inner bolt 38. In this embodiment, the diameter of the notch is less than the diameter of the outer bolt 36 and the inner bolt 38. In other words, the diameter of the notch 37 is smaller than the diameter of the portion of the shaft 8 that is coupled to the locking brackets 12 and shaft mounts 10.

The inner bolt 38 is a hexagonal bolt that is located along the shaft at an opposite side of the notch 37 to the side of the notch 37 at which the outer bolt 36 is located. In other words, the inner bolt 38 is located between the notch 37 and the portion of the shaft 8 that is coupled to the locking brackets 12 and shaft mounts 10. In this embodiment, the inner bolt 38 is substantially the same size and the outer bolt 36. In other words, the maximum diameter of the inner bolt 38 is substantially the same as the diameter of the portion of the shaft 8 that is coupled to the locking brackets 12 and shaft mounts 10.

In this embodiment, the clamping block 40 is made of metal. The clamping block 40 is fixed to the aircraft fuselage frame 4 by a fourth set of bolts, each of which is hereinafter referred to as a "fourth bolt" and is indicated in the Figures by the reference numeral 42. Each of the fourth bolts 42 passes through the body of the clamping block 40 and into the aircraft fuselage frame 4, thereby securely fixing the clamping block 40 the aircraft fuselage frame 4. In this embodiment, the clamping block 40 is fixed to the aircraft fuselage frame 4 by four fourth bolts 42. However, in other embodiments, the clamping block 40 may be fixed to the aircraft fuselage frame 4 by a different number of bolts, or using different fixing means.

In this embodiment, the shape of the clamping block 40 is substantially that of a plate with two wedge-shaped protrusions protruding from a surface of that plate. The wedge shaped protrusions are hereinafter referred to as the "first wedge" (which is indicated in FIG. 4 by the reference numeral 44) and the "second wedge" (which is indicated in FIG. 4 by the reference numeral 46).

In this embodiment, the first wedge 44 comprises a plurality of holes (hereinafter referred to as the "first wedge holes" and indicated in Figures by the reference numeral 48). The first wedge holes 48 extend from a top surface of the first wedge 44 into the body of the first wedge 44. In this embodiment, there are six first wedge holes 44. However, in other embodiments there may be a different number of first wedge holes 48.

In this embodiment, the second wedge 46 comprises a plurality of holes (hereinafter referred to as the "second wedge holes" and indicated in Figures by the reference numeral 50). The second wedge holes 50 extend from a top surface of the second wedge 46 into the body of the second wedge 46. In this embodiment, there are seven second wedge holes 50. However, in other embodiments there may be a different number of second wedge holes 50.

In this embodiment, the surface of the aircraft fuselage frame 4 from which the first end 18 of the shaft 8 extends is substantially perpendicular to the longitudinal axis of the shaft. Also, in this embodiment, the clamping block 40 is arranged such that the top surfaces of the first wedge 44 and the second wedge 46 (i.e. the surfaces of the wedges 44, 46 at which the wedge holes 48, 50 are located) are substantially perpendicular to the longitudinal axis of the shaft 8. Also, in this embodiment, the clamping block 40 is configured so that the top surfaces of the first wedge 44 and the second wedge 46 are aligned with one another. Thus, in this embodiment, the shape of the clamping block 40 advantageously allows that the clamping block 40 may be fixed (using the fourth bolts 42) to a surface of the aircraft fuselage frame 4 that is not perpendicular to the longitudinal axis of the shaft 8 whilst still providing surfaces (i.e. the top surfaces of the wedges 44, 46) that are perpendicular to the longitudinal axis of the shaft 8. In other embodiments, the clamping block 40 may have a different shape such that the functionality of the clamping block 40 described herein is provided.

In this embodiment, the clamping block 40 is arranged such that the first wedge 44 is further away from the longitudinal axis of the shaft 8 than the second wedge 46. In other words, the first wedge 44 is located at a greater distance from the shaft 8 (measured radially outwards from the shaft 8) than the second wedge 46.

In this embodiment, the clamping block 40 is arranged such that the first wedge holes 48 in the first wedge 44 lie along a circle whose centre lies along the longitudinal axis of the shaft 8. Also, in this embodiment, the clamping block 40 is arranged such that the second wedge holes 50 in the second wedge 50 each lie along one or two circles, that have different diameters from each other, and whose centres each lie along the longitudinal axis of the shaft 8.

A function of the clamping block 40 and the first end 18 of the shaft 8 will be described in more detail later below with reference to FIG. 6.

Figure 5:
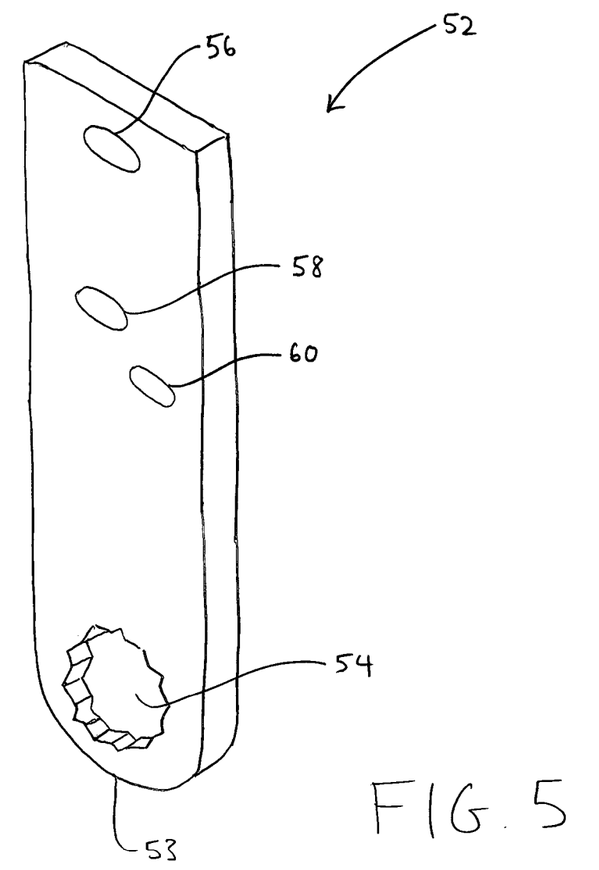
FIG. 5 is a schematic illustration (not to scale) of a perspective view of a locking plate.

FIG. 5 is a schematic illustration (not to scale) of a perspective view of a further component of the system 1, namely the locking plate 52.

In this embodiment, the locking plate 52 is made of metal. In this embodiment, the shape of the locking plate 52 is that of a cuboid having a rounded end portion (indicated in FIG. 5 by the reference numeral 53).

In this embodiment, the locking plate comprises a plurality of holes 54-60, each of which passes through the body of the locking plate 52 from a front side of the locking plate 52 to a rear side of the locking plate 52.

A first of the holes through the body of the locking plate 52 is hereinafter referred to as the "shaft hole" and is indicated in FIG. 5 by the reference numeral 54. The shaft hole 54 is referred to as such because, as described in more detail later below with reference to FIG. 6, during use, the locking plate 52 is positioned such that the shaft passes through the shaft hole 54.

In this embodiment, the shaft hole 54 is a "double hexagon hole", i.e. a hole the shape of which is the same as the 12-pointed, 24-sided shape produced by positioning two substantially identical hexagons such that their centre points are at the same point and each point of one hexagon is radially aligned with a mid-point of a side of the other hexagon.

In this embodiment, the shape of each of the hexagons that form the double hexagon shaft hole 54 is substantially the same as the hexagonal cross section of the outer and inner bolts 56, 58 of the first end 18 of the shaft 18.

The further holes through the body of the locking plate 52 are hereinafter referred to as the "first bolt hole" (indicated in FIG. 5 by the reference numeral 56), the "second bolt hole" (indicated in FIG. 5 by the reference numeral 58, and the "third bolt hole" (indicated in FIG. 5 by the reference numeral 60). The terminology "bolt hole" is used to described the bolt holes 56, 58, 60 because, as described in more detail later below with reference to FIG. 6, during use, the locking plate 52 is fixed to the clamping block 40 by passing bolts through a plurality of the bolt holes 56, 58, 60 and into wedge holes 48, 50 of the clamping block 40.

In this embodiment, the shape of each of the first bolt hole 56, the second bolt hole 58, and the third bolt hole 60 is an oval.

In this embodiment, the distance (measured in a direction that is perpendicular to the longitudinal axis of the shaft hole 54) between the longitudinal axis of the shaft hole 54 and the first bolt hole 56 is substantially the same as the distance (measured in a direction that is perpendicular to the longitudinal axis of the shaft 8) between the longitudinal axis of the shaft 8 and the first wedge holes 48. Also, the distance (measured in a direction that is perpendicular to the longitudinal axis of the shaft hole 54) between the longitudinal axis of the shaft hole 54 and the second bolt hole 58 is substantially the same as the distance (measured in a direction that is perpendicular to the longitudinal axis of the shaft 8) between the longitudinal axis of the shaft 8 and the second wedge holes 50 that lie along the larger of the two circles, centred about the longitudinal axis of the shaft 8, along which second wedge holes 50 lie. Also, the distance (measured in a direction that is perpendicular to the longitudinal axis of the shaft hole 54) between the longitudinal axis of the shaft hole 54 and the third bolt hole 60 is substantially the same as the distance (measured in a direction that is perpendicular to the longitudinal axis of the shaft 8) between the longitudinal axis of the shaft 8 and the second wedge holes 50 that lie along the smaller of the two circles, centred about the longitudinal axis of the shaft 8, along which second wedge holes 50 lie.

Thus, the fastening system 1 for securely fastening, or fixing, the aircraft door 2 against the aircraft fuselage frame 4 is provided.

Figure 6:
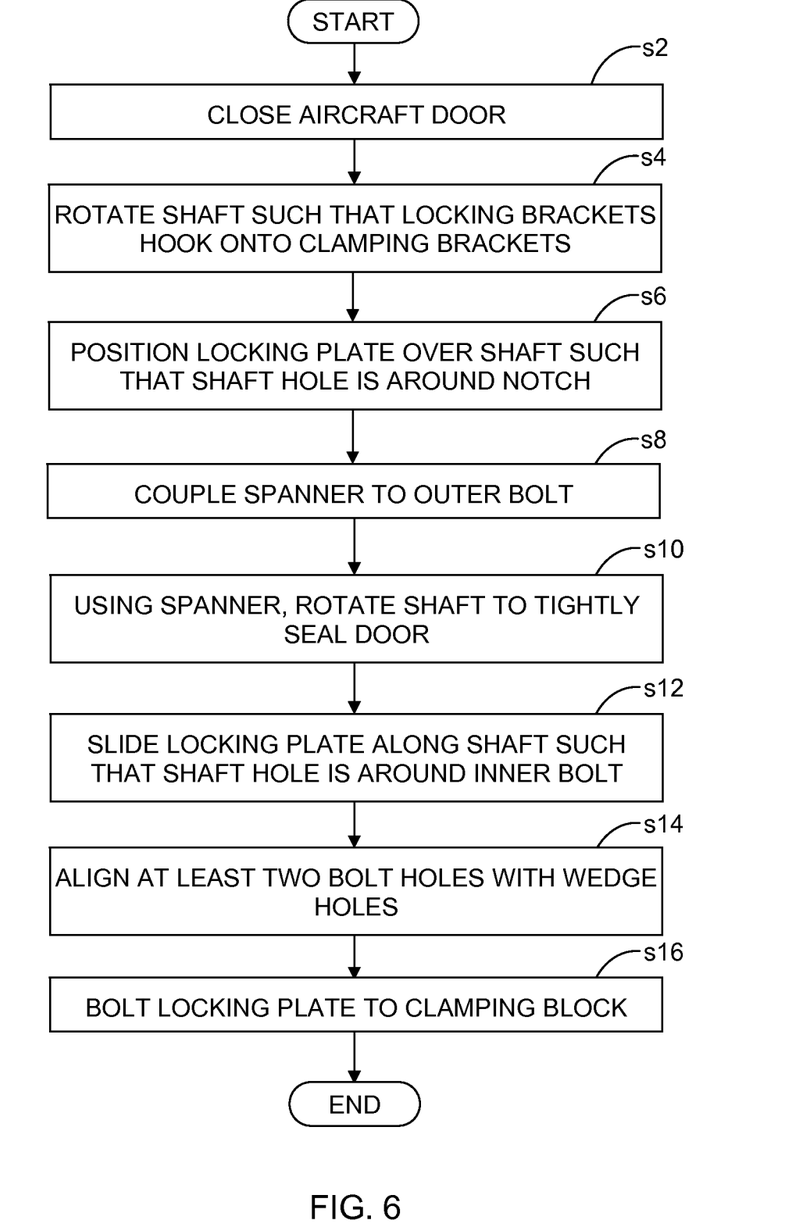
FIG. 6 is a process flow chart showing certain steps of an embodiment of a process of using the fastening system.

FIG. 6 is a process flow chart showing certain steps of an embodiment of a process of using the above described fastening system 1 to fix the aircraft door 2 against the aircraft fuselage frame 4.

It should be noted that certain of the process steps depicted in the flowchart of FIG. 6 and described below may be omitted or such process steps may be performed in differing order to that presented below and shown in FIG. 6. Furthermore, although all the process steps have, for convenience and ease of understanding, been depicted as discrete temporally-sequential steps, nevertheless some of the process steps may in fact be performed simultaneously or at least overlapping to some extent temporally.

At step s2, the aircraft door 2 is closed, i.e. the aircraft door 2 is moved against the aircraft fuselage frame 4. This may be performed manually or automatically. In this embodiment, the closing of the aircraft door 2 against the aircraft fuselage frame 4 causes each of the clamping brackets 14 to be positioned opposite to a respective locking bracket 12. In other words, the closing of the aircraft door 2 moves the clamping brackets to be in a position whereby, by rotating the shaft 8, the clamping brackets 14 may be engaged (i.e. hooked onto) by the locking brackets 12.

In this embodiment, after closing the aircraft door 2, the arrangement of the locking brackets 12 and clamping brackets 14 is that same as that shown in FIG. 2 and described above.

At step s4, the shaft 8 is rotated, about its longitudinal axis, in an anti-clockwise direction. Rotation of the shaft may be performed by any appropriate means, for example automatically (e.g. using a motor or actuator) or manually.

In this embodiment, the rotation of the shaft 8, in an anti-clockwise direction, about its longitudinal axis causes each of the locking brackets 12 to hook onto a crossbar 30 of a respective clamping bracket 14. Such rotation of the shaft 8 may cause the aircraft door 2 to be pulled closer to the aircraft fuselage frame 4. The engagement of the clamping brackets 14 by the locking brackets 12 (i.e. the hooking of the locking brackets 12 onto the crossbars 30 of the clamping brackets 14) may fix the position of the aircraft door 2 with respect to aircraft fuselage 14. In other words, the engagement of the clamping brackets 14 by the locking brackets 12 may fasten the aircraft door 2 closed (against the aircraft fuselage frame 4).

In this embodiment, after rotating the shaft 8, in an anti-clockwise direction, about its longitudinal axis, the arrangement of the locking brackets 12 and clamping brackets 14 is that same as that shown in FIG. 3 and described above.

At step s6 the locking plate 52 is positioned over the first end 18 of the shaft 8 such that the shaft hole 54 is around the notch 37. In other words, the shaft hole 54 of the locking plate 52 is passed over the outer bolt 36 such that the shaft hole 54 is around the notch 37. In this embodiment, because the diameter of the notch 37 is less than the diameter of the outer and inner bolts 36, 38 (and therefore less than the diameter of the shaft hole 54), the locking plate 52 may be freely rotated about the shaft 8 (i.e. about the longitudinal axis of the shaft 8).

In this embodiment, the positioning of the locking plate 52 around the notch 37 is performed by a human operator.

At step s8, the human operator couples a spanner to the outer bolt 36 of the first end of the shaft 8. In particular, the spanner is coupled to the outer bolt 36 such that the jaws of the spanner grip the outer bolt 36, and a clamping bracket of the spanner extends radially outwards from the shaft 8.

At step s10, using the spanner, the human operator may further rotate the shaft 8, in an anti-clockwise direction, about the longitudinal axis of the shaft 8. This may cause the aircraft door 2 to be pulled further towards the aircraft fuselage frame 4. Thus, the aircraft door 2 may be tightly sealed against the fuselage 4.

At step s12, whilst the rotational force applied to the shaft 8 by the human operator using the spanner is maintained, the locking plate 52 is slid along the length of the shaft 8 (in a direction that points from the first end 18 of the shaft 8 to the second end 20 of the shaft) such that the shaft hole 54 is moved from being around the notch 37 to being around the inner bolt 38. Since a hexagon shape of the shaft hole 54 is substantially the same size and the inner bolt 36, movement of the locking plate 52, other than in a direction parallel to the longitudinal axis of the shaft 8, is opposed. In particular, when the shaft hole 54 is positioned around the inner bolt 36, the locking plate 52 is not free to rotate around the shaft 8. The locking plate 52 may grip the shaft 8 in a "spanner-like" fashion.

In this embodiment, prior to being slid along the shaft 8, the locking plate 52 is rotated such that, when the locking plate 52 is slid along the length of the shaft 8, the locking plate 52 contacts with the first and second wedges 44, 46 of the clamping block 40.

As described in more detail earlier above with reference to FIG. 4, the top surfaces of the first wedge 44 and the second wedge 46 (i.e. the surfaces of the wedges 44, 46 at which the wedge holes 48, 50 are located) are substantially perpendicular to the longitudinal axis of the shaft 8, and top surfaces of the first wedge 44 and the second wedge 46 are aligned with one another. Thus, when the locking plate 52 is slid along the length of the shaft 8 (such that the shaft hole 54 is around the inner bolt 38), the locking plate 52 contacts with the both first and second wedges 44, 46 of the clamping block 40.

At step s14, using the spanner, the human operator rotates the shaft 8, by a relatively small amount, in either a clockwise or an anti-clockwise direction, about the longitudinal axis of the shaft 8. Since the shaft hole 54 is around the inner bolt 38, and a hexagon shape of the shaft hole 54 is substantially the same size and the inner bolt 36, the rotation of the shaft 8 about its longitudinal axis causes the locking plate 52 to rotate about the longitudinal axis of the shaft 8. In this embodiment, the shaft is rotated until the first bolt hole 56 is aligned with one of the first wedge holes 48 and either the second bolt hole 58 is aligned with one of the second wedge holes 50 or the third bolt hole 60 is aligned with one of the second wedge holes 50. In this embodiment, the shaft 8 is rotated by the minimum distance required for the first bolt hole 56 to be aligned with one of the first wedge holes 48 and either the second bolt hole 58 to be aligned with one of the second wedge holes 50 or the third bolt hole 60 to be aligned with one of the second wedge holes 50.

Figure 7:
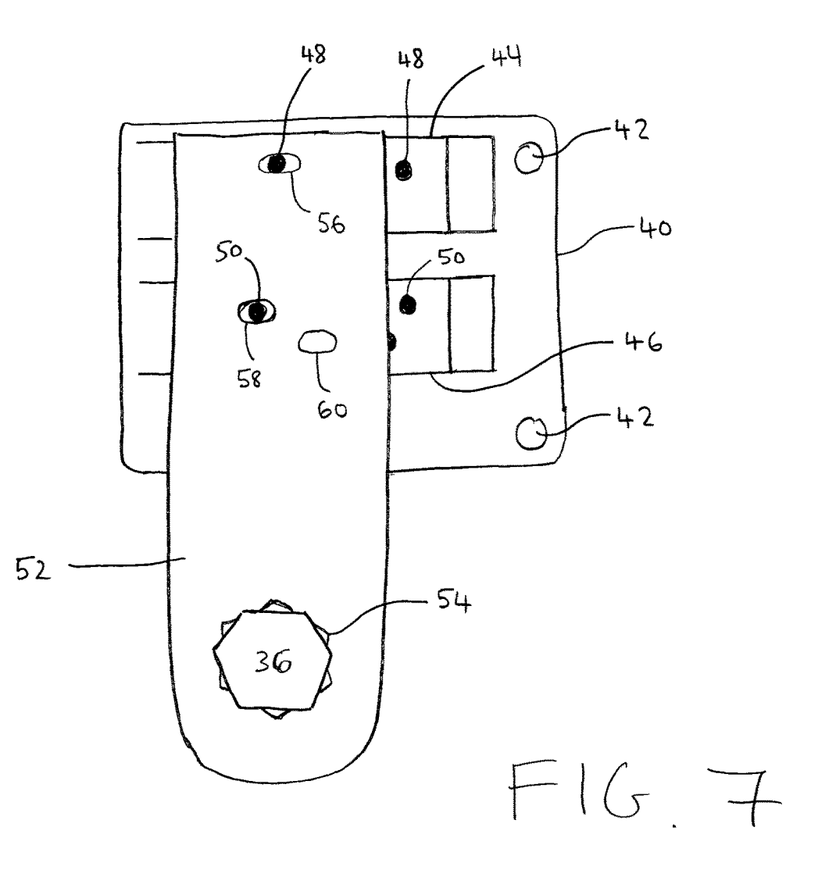
FIG. 7 is a schematic illustration (not to scale) showing an example configuration of components of the fastening system at a certain step of the process of FIG. 6.

FIG. 7 is a schematic illustration (not to scale) showing an example configuration of the inner bolt 36, the locking plate 52, and the clamping block 40 at step s14. FIG. 7 shows an example position of the inner bolt 36, the locking plate 52, and the clamping block 40 when viewed along the longitudinal axis of the shaft 8, in a direction that points from the first end 18 of the shaft 8 to the second end 20 of the shaft 20.

In this example, the shaft hole 54 of the locking plate 52 is around the inner bolt 36. Also, in this example, the locking plate 52 has been positioned such that it is in contact with the first wedge 44 and the second wedge 46. Also, in this example, the locking plate 52 has been positioned such that the first bolt hole 56 is aligned with a first wedge hole 48. Also, in this example, the locking plate 52 has been positioned such that the second bolt hole 58 is aligned with a second wedge hole 50. In other examples, the locking plate 52 may be positioned such that the third bolt hole 58 is aligned with a second wedge hole 50 instead of or in addition to the second bolt hole 58 being aligned with a second wedge hole 50.

At step s16, the locking plate 52 is bolted to the clamping block 40. In this embodiment, this bolting of the locking plate 52 to the clamping block 40 is performed by passing bolts, hereinafter referred to as the "fifth bolts", through each of the bolt holes 56, 58, 60 that have been aligned with a wedge hole 48, 50, and into the wedge hole 48, 58 with which that bolt hole 56, 58, 60 has been aligned.

Figure 8:
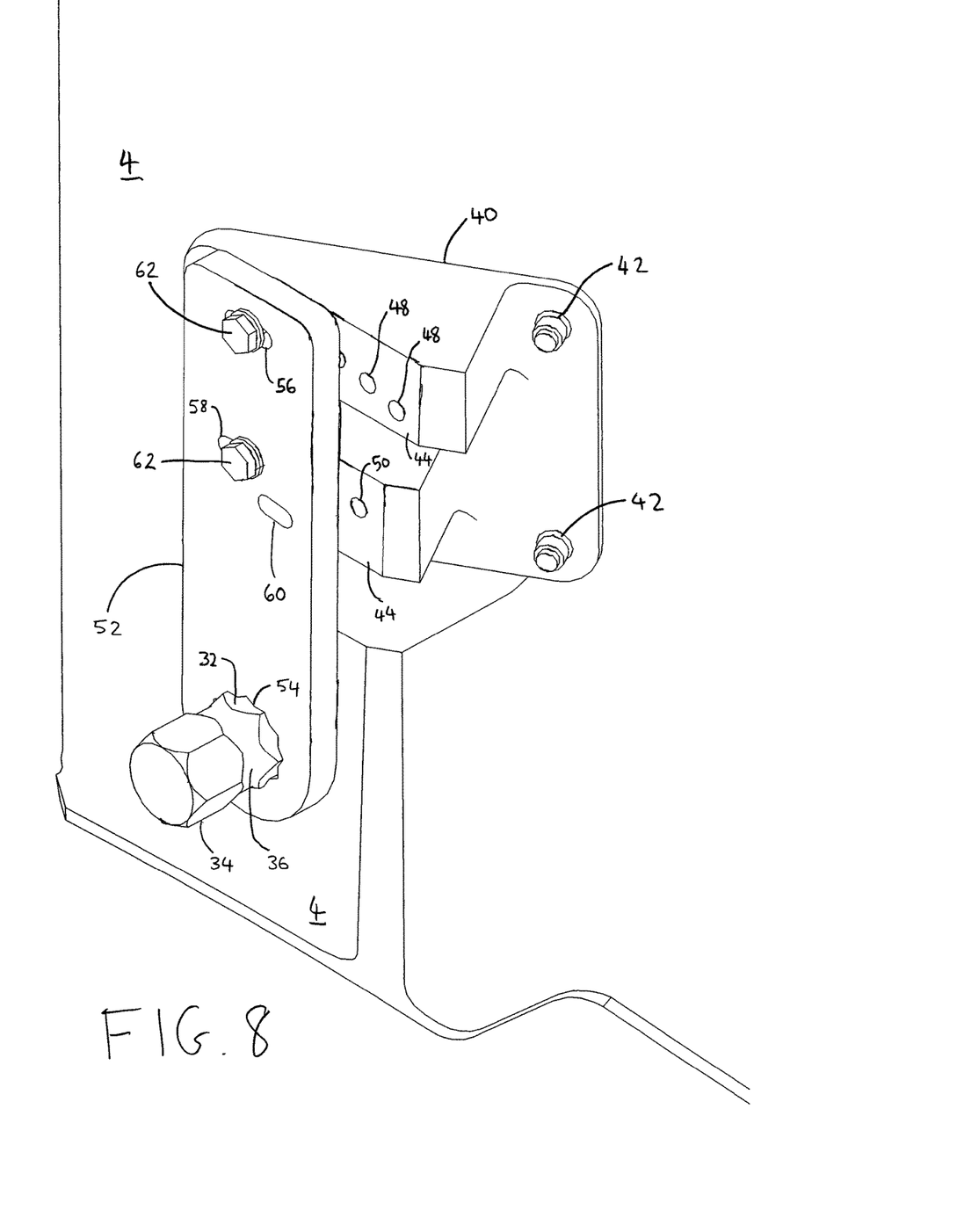
FIG. 8 is a schematic illustration (not to scale) showing an example configuration of components of the fastening system at a certain step of the process of FIG. 6.

FIG. 8 is a schematic illustration (not to scale) showing a perspective view of the fastening system components shown in FIG. 7, after the locking plate 52 has been bolted to the clamping block 40.

In this example, the shaft hole 54 of the locking plate 52 is around the inner bolt 36 and the locking plate 52 is in contact with the first wedge 44 and the second wedge 46. Also, in this example, the locking plate 52 has been bolted to the clamping block 40 by a fifth bolt 62 that passes through the first bolt hole 56 and into a first wedge hole 48 of the clamping block 40. Also, in this example, the locking plate 52 has been bolted to the clamping block 40 by a further fifth bolt 62 that passes through the second bolt hole 58 and into a second wedge hole 50 of the clamping block 40.

The locking plate 52, in effect, is a lever about a fulcrum (which in this case is the longitudinal axis of the shaft 8). This advantageously provides that, if the shaft 8 tries to rotate about its longitudinal axis, the force that would be experienced by the fifth bolts 62 (and the clamping block 40) tends to be significantly lower than the force rotating the shaft 8. Thus, the fifth bolts 62 and clamping block 40 tend to be able to prevent rotation of the shaft 8 even when larger rotations forces are applied to the shaft 8.

The use of two separate fifth bolts 62 to bolt the locking plate 52 to the clamping block 40 advantageously provides a level of redundancy. Thus, for example, if one of the fifth bolts 62 were to break, or come loose, the other fifth bolt 62 would still fix the locking plate 52 to the clamping block 40. In other embodiments, a different number of bolts may be used to fix the locking plate 52 to the clamping block 40, or different fixing means may be used.

In this embodiment, the bolting of the locking plate 52 to the clamping block 40 is such that the position of the locking plate 52 is substantially fixed relative to the clamping block 40. In other words, the bolting of the locking plate 52 to the clamping block 40 is such that the position of the locking plate 52 is the locking plate 52 is substantially immovable relative to the clamping block 40. Since the clamping block 40 is fixed relative to the aircraft fuselage frame 4, the position of the locking plate 52 relative to the aircraft fuselage is substantially fixed.

Thus, since the position of the shaft 8 may not rotate about its longitudinal axis without rotating, about the longitudinal axis of the shaft, the locking plate 52 (because the shaft hole 54 is around the inner bolt 36), the bolting of the locking plate 52 to the clamping block 40 tends to prevent rotation of the shaft 8 about its longitudinal axis.

Thus, the positions of the locking brackets 12 on the shaft tend to be maintained.

Thus, since the locking brackets 12 are engaged with, i.e. hooked onto, the clamping brackets 14 (which are fixed relative to the aircraft door 2), the position of the aircraft door 2 relative to aircraft fuselage frame 4 is substantially fixed.

Thus, the aircraft door 2 is held tightly closed against the aircraft fuselage frame 4, and movement of the aircraft door 2 (e.g. unwanted opening of the aircraft door) tends to be prevented.

The bolting of the locking plate 52 to the clamping block 40 in effect "locks" the aircraft door 2 in a closed position against the aircraft fuselage frame 4.

Thus, a process of using the above described fastening system 1 to fix the aircraft door 2 against the aircraft fuselage frame 4 is provided. The aircraft door 2 may be released (i.e. such that it is moveable with respect to the aircraft fuselage frame 4) by reversing to the method steps of FIG. 6.

An advantage provided by the above described system and method is that an aircraft bay door may be closed (by simply rotating the shaft) and fixed in position (by bolting the locking plate to the clamping block so that the shaft cannot further rotate) faster and more simply than using conventional methods. The aircraft bay door may be fixed in position using only two bolts (namely the fifth bolt which bolt the locking plate to the clamping block). This is in contrast to conventional systems and methods which typically use, for example, 40-60 bolts to secure an aircraft bay door.

The fastening system may located within the aircraft whose door is fastened by the fastening system. Thus, when the door is closed and fixed in position, an external surface of the aircraft door may be flush with a external surface of the rest of the aircraft fuselage. This may be because no external bolt fastenings are use to close and fix in position the aircraft door. This tends to improve the aerodynamic properties of the aircraft. Also, this tends to reduce the likelihood of the aircraft being detected by radar.

Enabling the aircraft doors to be closed and fixed relatively quickly and simply tends to allow for the doors of the aircraft to be secured, whilst the aircraft is on the ground, without the aircraft overheating. This is particularly useful in warm climates.

A relatively simple, easy to use locking mechanism for preventing avionics bay doors of an aircraft from opening during flight is provided.

The above described fastening system advantageously tends to be accessible on the aircraft, e.g. by a human operator, even when the aircraft engine is running.

The first end of the shaft and clamping block may be located within a main undercarriage bay of the aircraft. Thus, the first end of the shaft tends to be easy to access by a human operator. Also, the first end of the shaft and clamping block tend to be hidden when the aircraft undercarriage is retracted, thereby reducing the likelihood that first end of the shaft and clamping block are impacted by Foreign Object Debris.

Advantageously, the above describe door fastening system may be relatively easily retrofitted to existing aircraft.

The components of the above described fastening systems are made of metal, e.g. steel, which tends to be advantageously strong.

Advantageously, the above describe door fastening system tends to be useable on any aircraft platform.

An advantage provided by the above described system is that the clamping block and the locking plates are configured such that (when the locking plate is arranged such that the shaft hole is around the inner bolt of the shaft) at least two of the bolt holes in the locking plate may each be aligned with a respective wedge hole in the clamping block. This allows the locking plate to be bolted to the clamping block using at least two fifth bolts, thereby providing a level of redundancy. Furthermore, if the fifth bolts become loose, the shafts of the fifth bolts would tend to still hold the shaft clamped in position.

An advantage provided by the "double hexagon" shape of the shaft hole is that are greater number of options for positioning the locking plate such that it grips the inner bolt are provided (compared to if the shaft hole was a single hexagon shaped hole). This tends to facilitate the positioning of the locking plate such that the inner bolt is gripped by the locking plate, and such that the bolt holes of the locking plates are aligned with the wedge holes of the clamping block.

The so-called "double nut" first end of the shaft (i.e. the inner and out nuts with the notch in between those nuts) allows an operator, using a spanner, to manually adjust a position of the shaft. Thus, a human operator may, for example, rotate the shaft anti-clockwise so that the aircraft door is pulled further towards the aircraft fuselage. Also, a human operator may, for example when the locking plate is positioned around the inner bolt, rotate the shaft to align the bolt holes of the locking plate with the wedge holes of the clamping block. The notch advantageously provides that the locking plate may be free rotated around the shaft before being slid over the inner bolt. This facilitates alignment of the bolt holes of the locking plate with the wedge holes of the clamping block.

A further advantage provided by the above described apparatus and method is that if, for some reason, the clamping block and/or locking plate were to fail, the aircraft door would still tend to be held in a closed position by the locking brackets and clamping brackets.

In the above embodiments, the fastening system is used to fasten an aircraft door or hinged access panel closed. In other words, the fastening system is used to fix an aircraft door or hinged access panel, in a closed position, so that it does not move with respect to the rest of the aircraft fuselage. However, in other embodiments, the fastening system may be used to fix different types of entities (i.e. other than aircraft hinged access panels and/or fuselages) to one another. For example, in other embodiments, the fastening system may be used to fix a different type of aircraft door relative to the fuselage.

In the above embodiments the locking plate and the clamping block are used to prevent or oppose the rotation of a bolt that is connected to a shaft. However in other embodiments, the locking plate and the clamping block are used to prevent or oppose the rotation of a different entity. For example, in other embodiments, the locking plate and the clamping block may be used to prevent or oppose the rotation of a bolt that is connected to a further shaft that serves a different purpose to the shaft described in the above embodiments.

In other embodiments, any or all of the components of the fastening systems may be shaped differently, and/or made from a different appropriate material, to that described above such that the above described functionality is provided.

In other embodiments, micro switches or other electronic devices may be used to indicate to an operator (e.g. a pilot of the aircraft) that all clamps are fully engaged and the aircraft door is being held in the closed position.

The invention claimed is:

1. An aircraft fuselage (4) comprising:
an aircraft door or access panel (2) comprising one or more receiving elements (14); and locking apparatus for securing the aircraft door or access panel (2) in an opening formed in the aircraft fuselage (4), the locking apparatus comprising:

a shaft (8) having a longitudinal axis;

at least one mounting member (10) for mounting the shaft (8) to the aircraft fuselage (4) such that the shaft (8) may be rotated about its longitudinal axis;

a securing member (12) fixedly mounted to the shaft (8) and arranged such that:

rotation of the shaft (8) about its longitudinal axis moves the securing member (12) from being in a first position to being in a second position;

the first position of the securing member (12) is a position in which the securing member (12) are not coupled to the receiving element (14) of the aircraft door or panel (2), thereby allowing movement of the aircraft door or panel (2) relative to the aircraft fuselage (4); and the second position of the securing member (12) is a position in which the securing member (12) are coupled to the receiving element (14) aircraft door or panel (2), thereby preventing movement of the aircraft door or panel (2) relative to the aircraft fuselage (4);

a locking member (52) for coupling to the shaft (8) such that rotation of the shaft (8) about its longitudinal axis causes movement of the locking member (52); and fixing means for, when the shaft (8) has been rotated such that the securing member (12) are in the second position, fixedly attaching the locking member (52) to the aircraft fuselage (4) thereby preventing rotation of the shaft (8);

wherein the locking member (52) is configured to be coupled to the shaft (8) such that the locking member (52) forms a lever that is rotatable about a fulcrum, the fulcrum being the longitudinal axis of the shaft (8); and wherein the locking member (52) is configured to be fixedly attached, by the fixing means, to the aircraft fuselage (4) at a point along a length of the locking member (52) that is proximate to a distal end of the locking member (52).

2. The aircraft fuselage (4) according to claim 1, wherein the locking member (52) is configured to be fixedly attached, by the fixing means, to the aircraft fuselage (4), at a plurality of different points on the locking member (52).

3. The aircraft fuselage (4) according to claim 1, wherein:

the shaft (8) comprises a bolt (38), a longitudinal axis of the bolt (38) being aligned with the longitudinal axis of the shaft (8); and the locking member (52) comprises a hole (54), the shape of the hole (54) corresponding to the shape of the bolt (38) such that the locking member (52) may be coupled to the shaft (8) by positioning the locking member (52) relative to the shaft (8) such that the bolt (38) is in the hole (54).

4. The aircraft fuselage (4) according to claim 3, wherein the shaft (8) comprises a notch (37), a diameter of the notch (37) being less than a diameter of the hole (54) in the locking member (52) such that, when the locking member (52) is positioned relative to the shaft (8) such that the notch (37) is in the hole (54), the locking member (52) may be rotated about the longitudinal axis of the shaft (8) without the shaft (8) being rotated, thereby allowing an orientation of the locking member (52) relative to the shaft (8) to the adjusted.

5. The aircraft fuselage (4) according to claim 1, wherein the shaft (8) comprises an adjustment bolt (36), a longitudinal axis of the adjustment bolt (36) being aligned with the longitudinal axis of the shaft (8), the adjustment bolt (36) being positioned at point along the length of the shaft (8) such that, using the adjustment bolt (36), a human operator may rotate the shaft (8).

6. The aircraft fuselage (4) according to claim 1, wherein the fixing means comprises a clamping block (40) that is fixedly attached to the aircraft fuselage (4) and is configured to provide one or more surfaces (44, 46) that are substantially perpendicular to the longitudinal axis of the shaft (8); and the locking member (52) is fixedly attached to the aircraft fuselage (4) by fixedly attaching the locking member (52) to a surface (44, 46) of the clamping block (40) that is substantially perpendicular to the longitudinal axis of the shaft (8).

7. The aircraft fuselage (4) according to claim 6, wherein the locking member (52) is configured to be fixedly attached the clamping block (40) by, for one of more bolts (62), positioning each of those bolts (62) such that that bolt (62) is within a respective hole (56, 58, 60) through the locking member (52) and in a respective hole (48, 50) in the clamping block (40).

8. The aircraft fuselage (4) according to claim 1, wherein the receiving element includes one or more clamping brackets (14) fixedly attached to the aircraft door or panel (2), wherein the securing member (12) are configured to attach to the one or more clamping brackets (14).

9. The aircraft fuselage (4) according to claim 8, the securing member (12) includes one or more locking brackets (12), each locking bracket (12) being fixedly attached to the shaft (8) at a position along the length of the shaft (8), each locking bracket (12) being configured to be hooked onto a respective clamping bracket (14) such that that clamping bracket (14) is securely held by that locking bracket (12).

10. The aircraft fuselage (4) according to claim 1, wherein the aircraft door or panel (2) is a hinged door or panel.

11. The aircraft fuselage (4) according to claim 1, wherein the shaft (8), the at least one mounting member (10), the securing member (12), the locking member (52), and the fixing means are made of metal.

\* \* \* \* \*